US011926680B2

(12) United States Patent
Fei

(10) Patent No.: US 11,926,680 B2
(45) Date of Patent: Mar. 12, 2024

(54) HIGH-PERFORMANCE ANODES FOR LITHIUM ION BATTERIES

(71) Applicant: University of Louisiana at Lafayette, Lafayette, LA (US)

(72) Inventor: Ling Fei, Lafayette, LA (US)

(73) Assignee: University of Louisiana at Lafayette, Lafayette, LA (US)

(*) Notice: Subject to any disclaimer, the term of this patent is extended or adjusted under 35 U.S.C. 154(b) by 331 days.

(21) Appl. No.: 17/060,187

(22) Filed: Oct. 1, 2020

(65) Prior Publication Data

US 2021/0102005 A1    Apr. 8, 2021

Related U.S. Application Data

(60) Provisional application No. 62/909,297, filed on Oct. 2, 2019.

(51) Int. Cl.
| | | |
|---|---|---|
| C08B 37/00 | (2006.01) | |
| C08B 37/08 | (2006.01) | |
| C08J 3/12 | (2006.01) | |
| C08J 7/04 | (2020.01) | |
| H01M 4/38 | (2006.01) | |
| H01M 4/60 | (2006.01) | |
| H01M 4/66 | (2006.01) | |
| H01M 10/0525 | (2010.01) | |

(52) U.S. Cl.
CPC ............ C08B 37/003 (2013.01); C08J 3/12 (2013.01); C08J 7/04 (2013.01); H01M 4/386 (2013.01); H01M 4/608 (2013.01); H01M 4/667 (2013.01); H01M 10/0525 (2013.01); C08J 2305/08 (2013.01)

(58) Field of Classification Search
CPC ....... C08B 37/003; C08J 3/12; H01M 4/1395; H01M 4/624
See application file for complete search history.

(56) References Cited

U.S. PATENT DOCUMENTS

2017/0200943 A1* 7/2017 Kawakami ............. H01G 11/40
2021/0202978 A1* 7/2021 Hu ..................... H01M 10/0525

FOREIGN PATENT DOCUMENTS

| BR | 102017022250 | * | 5/2019 |
|---|---|---|---|
| BR | 102017022250 A | * | 5/2019 |
| CN | 103387684 | * | 11/2013 |
| CN | 103387684 A | * | 11/2013 |
| CN | 107275590 | * | 10/2017 |
| CN | 107275590 A | * | 10/2017 |
| CN | 110054712 | * | 7/2019 |
| CN | 110054712 A | * | 7/2019 |

* cited by examiner

Primary Examiner — Lucas J. O'Donnell
(74) Attorney, Agent, or Firm — Kean Miller LLP; Jessica C. Engler; Lauren J. Rucinski

(57) ABSTRACT

This invention provides a method whereby Si microparticles ("Si MP") with low cost and nitrogen-abundant chitin fibers from crustacean shells are used as raw materials to produce Si nanoparticles and nitrogen doped carbon composite via a scalable ball milling method. During the ball-milling process, Si MP are downsized, and the chitin fibers are wrapped around the particles. The milled product is then post-thermally treated to obtain Si and nitrogen doped carbon composites.

4 Claims, 3 Drawing Sheets

HIGH-PERFORMANCE ANODES FOR LITHIUM ION BATTERIES

CROSS REFERENCE TO RELATED APPLICATIONS

This application claims priority to the U.S. Provisional Application No. 62/909,297 filed on Oct. 2, 2019 and entitled "High-Performance Anodes for Lithium Ion Batteries."

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

SUMMARY OF THE INVENTION

The invention a method of cost-effectively producing silicon ("Si") and nitrogen ("N") doped carbon composites as anode materials for lithium ion batteries, and the resulting composition of matter. Si microparticles (Si MP) and nitrogen-abundant chitin fibers from crustacean shells waste are used as raw materials to produce cost-effective Si nanoparticles and nitrogen doped carbon composites via scalable ball milling and post heat treatment.

DESCRIPTION OF THE DRAWINGS

The drawings constitute a part of this specification and include exemplary embodiments of the High-Performance Anodes for Lithium Ion Batteries, which may be embodied in various forms. It is to be understood that in some instances, various aspects of the invention may be shown exaggerated or enlarged to facilitate an understanding of the invention. Therefore the drawings may not be to scale.

BACKGROUND

Figure 1:
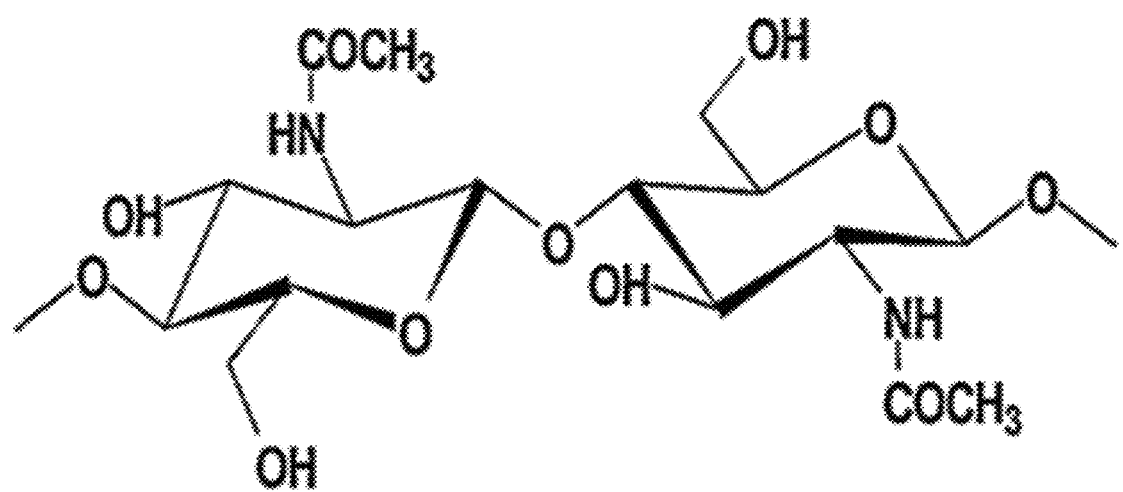
FIG. 1 is the chemical formula of chitin.

The invention a method of cost-effectively producing silicon ("Si") and nitrogen ("N") doped carbon composites as anode materials for lithium ion batteries, and the resulting composition of matter.

The market for lithium ion batteries ("LIB") has become one of the most rapid growing businesses due to the crucial role of batteries in electronics (computers, mobile phones, cameras) and the exponentially growing electric vehicle ("EV") industry. The use of LIB is expected to expand to 92.2 billion USD by 2024 with a compound annual growth rate ("CAGR") as high as 16.2.

The performance of LIBs strongly depends on the electrode materials. Graphite is the current commercially applied anode material, but it has a low theoretical capacity (372 mAh/g).

One major challenge in the development of LIBs is to find safe and cheap anode materials with large reversible capacity, desirable rate capability, long cycle life, and good compatibility with electrolyte and binder systems.

Silicon has the highest theoretical capacity for use in batteries, but it suffers from low conductivity and large volume expansion. Prior art has used nanosized Si structures and carbon coating to tackle these issues. But the prior art has not solved the issue of scalability and industrial applicable. This is because of the relatively high cost of Si nanoparticles and the complicated fabrication process.

This invention provides a simplified approach, wherein Si microparticles ("Si MP") and nitrogen-abundant chitin fibers from crustacean shells waste are used as raw materials to produce cost-effective Si nanoparticles and nitrogen doped carbon composites via scalable ball milling and post heat treatment.

Any seafood products harvesting area, such as those along the Gulf Coast of the United States, experiences tons of waste crustacean shells every year that usually ends up in landfills. Converting the crustacean shells into chitin fibers is a revolutionary solution to addresses emerging environmental issues while offering cheap materials to the renewable energy industry. For instance, Louisiana, one of the nation's busiest seafood products harvesting area, experiences tons of waste crustacean shells every year. Although these waste crustacean shells are rich in chitin, they usually end up in landfills. It would be commercially and environmentally valuable to recycle chitin nanofibrils from waste shells and integrate them into energy storage materials.

DETAILED DESCRIPTION

The subject matter of the present invention is described with specificity herein to meet statutory requirements. However, the description itself is not intended to necessarily limit the scope of claims.

This invention provides a method whereby Si microparticles ("Si MP") with low cost and nitrogen-abundant chitin fibers from crustacean shells are used as raw materials to produce Si nanoparticles and nitrogen doped carbon composite via a scalable ball milling method. During the ball-milling process, Si MP are downsized, and the chitin fibers are wrapped around the particles. The milled product is then post-thermally treated to obtain Si and nitrogen doped carbon composites.

Silicon, with the highest theoretic capacity of 4200 mAh/g (ten times higher than that of graphite), is widely considered as the future generation of anode technology for high energy density batteries. However, there are also severe drawbacks, silicon suffers severe degradation of performance due to poor conductivity, large volumetric changes, and continuous formation of solid electrolyte interphase ("SEI") layers. To address these issues, coating conductive carbon on silicon and reducing silicon size have been two proven remedies.

Nanosized silicon is expensive and typically requires complex and tedious synthetic routes, which severely hinders its large-scale production. The use of silicon microparticles is more attractive due to their high availability and low cost. For Si coating, nitrogen doped carbon is preferred since nitrogen doping effectively increases the electrical conductivity and electrochemical activity of the materials. Nitrogen atoms with two lone pairs of electrons are more electronegative and tends to attract positively charged atoms, while the electron density of the adjacent carbon becomes lower and favorably interacts with negative particles.

Generally, two separate steps are required to make carbon coated nano-silicon composites: 1) obtaining nanosized Si by either purchasing at a high price from vendors or downsizing from Si microparticles; 2) coating the nanosized Si with carbon, usually a dense carbon layer via chemical vapor deposition or pyrolysis of polymer coating. This invention provides a method to simplify the preparation approach by combining the two steps into a single one, which significantly cuts the processing time and cost.

Additionally, the inventive method controls the carbon layer with beneficial structures instead of the traditional dense carbon layer coating. In one embodiment, a nanofibril network wrapping is used to offer natural percolation sites for electrolyte to penetrate easily, while increasing the capability of the coating to resist the volume expansion of silicon during lithiation. To fabricate nanofibril wrapped silicon, chitin, a nitrogen-containing biopolymer found in crustacean shells, is selected as the carbon source. Because chitin is not only abundant, but also has the natural nanofibril structure that can be directly wrapped around silicon during ball milling. The chemical formula of chitin is shown in below in FIG. 1.

EXAMPLE

First, the chitin is extracted from the exoskeleton of crustaceans according to a modified method. In one embodiment, such crustacean is a crawfish. However, any suitable source of chitin is envisioned, such as from the exoskeleton of any insects and other arthropods. The flow diagram of FIG. 2 shows the extraction process for one embodiment.

In this embodiment, crawfish shells are cleaned and broken down via grinding. The obtained powder is then treated with a dilute hydrochloric acid ("HCl") solution to remove mineral salts such as calcium carbonate. The obtained product is further treated with dilute potassium hydroxide (KOH) for the removal of proteins. The obtained powder will then be rinsed and redispersed in water and passed multiple times through a grinder to obtain isolated chitin nanofibrils.

Figure 2:
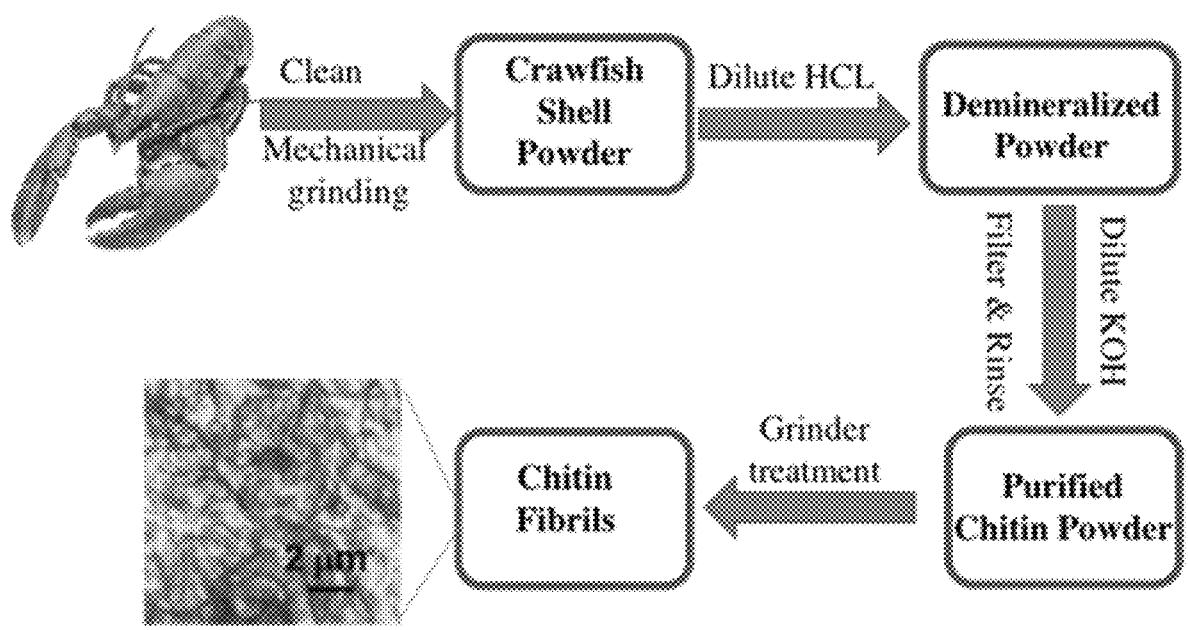
FIG. 2 is the extraction process of chitin from waste crawfish shell.

The TEM image of FIG. 2 shows the fibril structure of chitin. In one or more embodiments, the pigment is removed. In other embodiments, the chitin nanofibrils are carbonized.

Ball milling is then performed to prepare the composite material. Ball milling has advantages over other manufacturing process, including the low cost of installation and grinding medium, the ease of scaling-up production, the flexibility for both batch and continuous operation, and the wide application range suitable for various materials. Ball milling aids in downsizing the Si MP as well coating the particle surface with chitin fibrils.

Figure 3:
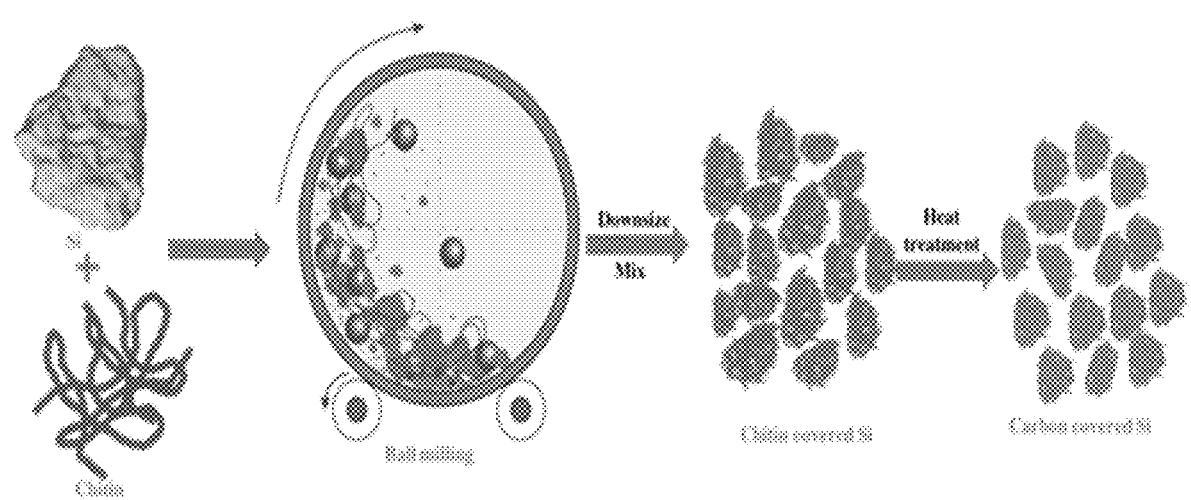
FIG. 3 is the schematic illustration of the production of silicon and carbon nanofibrils composites.

After treating the obtained composite in an inert atmosphere at elevated temperature, carbon nanofibrils wrapped Si can be obtained. The process is illustrated in FIG. 3. The carbon nanofibrils form a conductive network for fast electron transfer and greatly alleviate the volume expansion of the silicon during lithium ion insertion. Compared to traditional dense carbon layer coating, the proposed carbon network structure has better chance to endure volume expansion. If one fibril fails, there are still hundreds of others. If part of the dense carbon coating layer peels off, the silicon under the coating will be exposed. Additionally, the carbon network structure has pores between the carbon nanofibrils that allows fast electrolyte penetration, in other words, fast ion transfer.

Therefore, this invention has great commercial potential as it recycles abundant raw waste shell material and utilizes its natural fibril structure to make high-performance Si/carbon nanofibrils via a scalable and low-cost manufacturing method.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

The invention claimed is:

1. A method for making a nitrogen doped carbon composite comprising:
   grinding an exoskeleton from a crawfish to make a crawfish powder;
   washing the crawfish powder with an acid to reduce a mineral content of the crawfish powder;
   washing the demineralized crawfish powder with a base to reduce a protein content of the crawfish powder;
   contacting the crawfish powder and silicon microparticles to make a mixture;
   grinding the mixture to reduce a size of the silicon microparticles to silicon nanoparticles to make a first composite;
   carbonizing the first composite to make a nitrogen doped carbon composite, wherein the nitrogen doped carbon composite comprises silicon nanoparticles.

2. The method of claim 1 wherein the acid is hydrochloric acid.

3. The method of claim 1 wherein the base is potassium hydroxide.

4. The method of claim 1 further comprising the step of removing the pigment of said first composite.

* * * * *